United States Patent
Fijimoto et al.

[11] Patent Number: 5,958,575
[45] Date of Patent: Sep. 28, 1999

[54] MAGNETO-OPTICAL RECORDING MEDIUM

[75] Inventors: Kensuke Fijimoto; Shunichi Hashimoto; Yoshitaka Ochiai, all of Kanagawa, Japan

[73] Assignee: Sony Corporation, Tokyo, Japan

[21] Appl. No.: 08/548,605

[22] Filed: Oct. 26, 1995

Related U.S. Application Data

[63] Continuation of application No. 08/173,131, Dec. 22, 1993, abandoned, which is a continuation of application No. 07/815,072, Dec. 27, 1991, abandoned.

[30] Foreign Application Priority Data

Dec. 28, 1990 [JP] Japan .................................. 2-416350
Aug. 30, 1991 [JP] Japan .................................. 3-244990

[51] Int. Cl.$^6$ ........................................................ G11B 5/66
[52] U.S. Cl. ........................... 428/332; 428/336; 428/611; 428/694 ML; 428/694 SC; 428/694 RE; 428/694 EC; 428/694 MT; 428/694 MM; 428/900; 369/13; 369/14; 365/122
[58] Field of Search ........................... 428/694 MM, 428/694 ML, 694 SC, 694 RE, 694 EC, 694 MT, 611, 332, 336, 900; 369/13, 14; 365/122

[56] References Cited

U.S. PATENT DOCUMENTS

| | | |
|---|---|---|
| 4,576,699 | 3/1986 | Sato et al. ........................ 204/192.26 |
| 4,587,176 | 5/1986 | Carcia ................................... 428/611 |

FOREIGN PATENT DOCUMENTS

| | | |
|---|---|---|
| 210 855 | 2/1987 | European Pat. Off. . |
| 258978 | 3/1988 | European Pat. Off. . |
| 0 291 248 | 11/1988 | European Pat. Off. . |
| 304873 | 3/1989 | European Pat. Off. . |
| 0 376 375 | 12/1989 | European Pat. Off. . |
| 116918 | 11/1987 | Japan . |
| 211141 | 9/1988 | Japan . |

OTHER PUBLICATIONS

Patent Abstracts of Japan, vol. 13, No. 149 (p. 855) Apr. 12, 1989 & JP–A–63 311 641 (Sony Corp.) Dec. 20, 1988.
Patent Abstracts of Japan, vol. 14, No. 233 (p. 1049) (4176) May 17, 1990 & JP–A–25 6 752 (Sony Corp.) Feb 26, 1990.
Patent Abstracts of Japan, vol. 15, No. 331 (p. 1241) Aug. 22, 1991, & JP–A–31 20 643 (Sanyo Electric Co. Ltd.), May 22, 1991.
Patent Abstracts of Japan, vol. 15, No. 395 (p. 1260) Oct. 7, 1991 & JP–A–31 57 838 (Nikon Cor.) Jul. 5, 1991.
1989 Digest of Intermag, '89 International Magnetics Conference Mar. 31, 1989, Washington DC, U.S. P. GB–4, R. J. Gambino et al, "Exchange Coupled CoPd/TbCo Magneto–Optic Storage Films".
Nakamura et al, "Magneto–optical Properties of PdCo Based Multilayered Films"; IEEE Trans. Mag. 25(5) Sep. 1989; pp. 3758–3760.
Draaisma, et al "Perpendicular Anisotropy in Pd/Co Multilayers"; J. Appl. Phys. 63(8); Apr. 1988; pp. 3479–3481.
Gambino et al, "Exchange Coupled CoPd/TbCo Magneto–optic Storage Films", IEEE Trans. Mag. 25(5), Sep. 1989; pp. 3749–3751.

Primary Examiner—Leszek Kiliman
Attorney, Agent, or Firm—Hill & Simpson

[57] ABSTRACT

A magneto-optical recording medium is disclosed in which magnetic layer has a multi-layer structure consisting of an artificial lattice film constituted by a Co layer and a Pt layer and/or a Pd layer stacked together and a rare earth-transition metal layer. High coercivity may be achieved by the rare earth-transition metal film whilst a satisfactory Kerr rotation angle in the short wavelength range may be assured by the artificial lattice film. The magneto-optical recording medium may cope with the next-generation high density recording employing a short wavelength laser.

8 Claims, 4 Drawing Sheets

5,958,575

MAGNETO-OPTICAL RECORDING MEDIUM

This is a continuation of application Ser. No. 08/173,131 filed Dec. 22, 1993, now abandoned, which is a continuation of 07/815,072, filed Dec. 27, 1991, now abandoned.

BACKGROUND OF THE INVENTION

1. Field of the Invention

This invention relates to a magneto-optical recording medium for information recording and/or reproduction by a laser light or the like by taking advantage of magneto-optical effects.

2. Description of the Related Art

Recently, a magneto-optical recording system in which information is recorded by writing magnetic domains on a magnetic thin film using thermal energy of, for example, a semiconductor laser light, and is read by taking advantage of magneto-optical effects, is attracting attention as an overwritable high density recording system.

Typical of the recording material employed in this magneto-optical recording system is an amorphous alloy film combined from rare earth elements, such as Gd, Tb or Dy, and transition metals, such as Fe or Co, referred to hereinafter as an RE-TM film. This RF-TM film has many advantages. For example, it tends to become a perpendicular magnetization film indispensable for high density recording because of its larger perpendicular magnetic anisotropic energy. Also, it is amorphous and thus suffers from less noise proper to the medium, while it has a larger Kerr rotation angle. In addition, it has a lower Curie temperature so that recording and/or erasure may be achieved with a commercially available semiconductor laser with a laser power of 20 to 40 mW. As disclosed for example in JP Patent Publication KOKOKU NO. 2-32690 (1990), a GdTbFeCo film containing Tb and Gd as rare earth elements is known to have an especially large Kerr rotation angle to produce a satisfactory signal-to-noise (S/N) ratio.

On the other hand, as described for example in JP Patent Publication KOKAI No.2-56752 (1991), there is proposed a magneto-optical recording medium in which an artificial lattice film comprised of alternately stacked Co and Pt and/or Pd layers is used as a recording film. This magneto-optical recording medium, free of rare earth elements, is superior in corrosion resistance, while having a high magnetic Kerr rotation angle in a short wavelength range. Thus it is thought to be a promising recording material suitable for next-generation high-density recording making use of a short-wavelength laser.

Meanwhile, in magneto-optical recording system, it is customary to apply a bias magnetic field during recording for inverting magnetization at a region the temperature of which has been raised by laser irradiation. Therefore, in order for a recorded magnetic domain not to be affected by the bias magnetic field, it is desirable that the coercive force of the magneto-optical recording medium be sufficiently high with respect to the recording magnetic field (bias magnetic field). On the other hand, since the minimum size of the recording bit is inversely proportionate to the coercive force, a larger coercive force is similarly desired for achieving higher recording density.

In this consideration, the coercive force of the magneto-optical recording medium employing the above mentioned artificial lattice film as a recording film cannot be said to be completely satisfactory.

SUMMARY OF THE INVENTION

It is an object of the present invention to provide a magneto-optical recording medium having an artificial lattice film having alternately stacked Co and Pt and/or Pd layers as a recording film, which is improved in the coercive force and characteristics of the recording magnetic field to cope with high density recording.

The present invention provides a magneto-optical recording medium comprising a magnetic layer on a substrate, characterized in that said magnetic layer is constituted by an artificial lattice film and a rare earth-transition metal film consisting essentially of a rare earth element and a transition metal, said artificial lattice film being constituted by a Co layer and a Pt layer and/or a Pd layer, stacked together, said artificial lattice film and said rare earth-transition metal film being exchange-coupled to each other.

In this manner, the magneto-optical recording medium having an artificial lattice film having alternately stacked Co and Pt and/or Pd layers as a recording film may be improved in coercivity and recording magnetic field characteristics to cope with high density recording.

DETAILED DESCRIPTION OF THE PREFERRED EMBODIMENT

Figure 1:
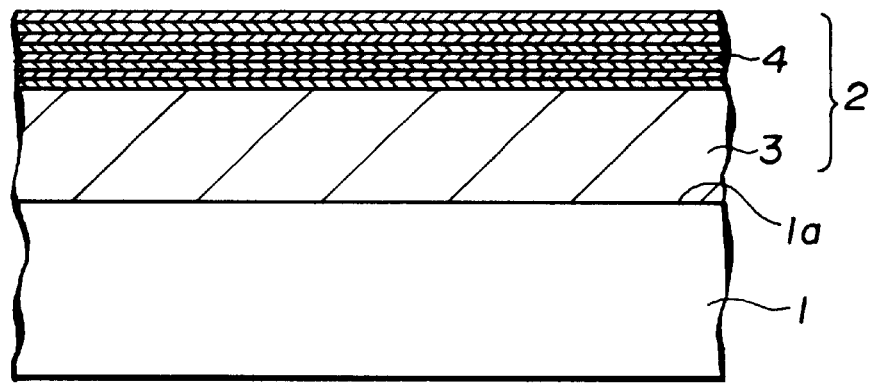
FIG. 1 is a cross-sectional view showing the structure of a magneto-optical recording medium embodying the present invention.

The magneto-optical recording medium according to the present invention has a magnetic layer on a substrate, wherein said magnetic layer is constituted by an artificial lattice film and a rare earth-transition metal film consisting essentially of a rare earth element and a transition metal, said artificial lattice film being constituted by a Co layer and a Pt layer and/or a Pd layer, stacked together, said artificial lattice film and said rare earth-transition metal film being exchange-coupled to each other.

With the magneto-optical recording medium of the present invention, the magnetic layer has a stacked structure of an artificial lattice film and a rare earth-transition metal film which are bonded together by exchange coupling.

The artificial lattice film may be a Co—Pt based artificial lattice film, comprised of alternately stacked Co and Pt layer(s), a co—Pd based artificial lattice film, comprised of alternately stacked Co and Pd layer(s), or a Co—Pt—Pd based artificial lattice film, comprised of alternately laminated Co, Pt and Pd layers in any desired sequence. It is noted that, with the Co—Pt—Pd based artificial film, the Pt and Pd layers may be replaced by a Pt—Pd alloy layer.

With the above artificial lattice film, deposition for stacking is preferably so made that the Co layer as the transition metal layer be formed at an interface of the lattice film with the rare earth-transition metal film.

In any case, the artificial lattice film has a total thickness of preferably 50 to 800 Å and more preferably 50 to 400 Å for achieving practicaly necessary and sufficient magneto-optical characteristics.

It is also preferred that, with the Co—Pt based artificial lattice film, thicknesses of the Co layer and the Pd layer be selected to be in the ranges of from 2 to 8 Å and from 3 to 40 Å, respectively, and that, with the Co—Pd based artificial lattice film, thicknesses of the Co layer and the Pd layer be selected to be in the ranges of from 1 to 9 Å and from 2 to 40 Å, respectively. These ranges of the film thicknesses are selected for optimizing magneto-optical characteristics. Outside of these ranges, no satisfactory magneto-optical properties are produced.

Meanwhile, the interface of the metal layer constituting the artificial lattice film ideally has a so-called superlattice structure in which heterogenous metal atom are formed in a flat layer without intruding into one another. However, such interface may also have a composition-modulated structure in which the composition is changed with certain periodicity on the whole despite certain disturbances at the interface. Scrutinizing into the above mentioned ranges of the thicknesses of the metal layers, the lower limit of the metal layers may be lesser than one atom size, in view of the radius of the metallic bond of each metal layer which is 1.25 Å for Co, 1.38 Å for Pd and 1.39 Å for Pt. Notwithstanding, the above mentioned preferred ranges of the thicknesses have been set in view of the composition-modulated structure.

The above mentioned artificial lattice film may be formed by, for example, sputtering, molecular beam epitaxy, vacuum deposition or ion beam deposition, most customarily, by sputtering.

In preparing binary system artificial lattice films, such as Co—Pt or Co—Pd based films, separate sources of evaporation need to be provided for respective metal components. In preparing ternary system artificial lattice films, such as Co—Pt—Pd based films, separate sources of evaporation may similarly be provided for respective metal components. However, as far as Pd and Pt are concerned, a source of evaporation for a Pd—Pt alloy may also be provided, or alternatively, a source of evaporation for the metal component used in a lesser amount may be superimposed on a source of evaporation for the metal component used in a larger amount to provide a composite source of evaporation. For example, the above mentioned magneto-optical recording medium of the ternary system may be prepared by concurrent binary or dual sputtering employing a Pd target supporting a Pt chip thereon and a Co target, concurrent ternary sputtering employing Co—, Pd— and Pt targets, or by concurrent quaternary sputtering employing a Co target, a Pt target and two Pd targets, in which respective metal layers are deposited in the sequence of Co—Pd—Pt—Pd— . . . .

Additive element(s) may also be optionally added to the artificial lattice film for improving its thermal stability or lowering Curie temperature.

The species and/or amount of addition of the additive elements need to be changed depending on the type of the artificial lattice films or the types of the metal layers.

For example, when adding the additive element(s) to the Co layer of the artificial lattice film consisting of Co and Pt layers, deposited in stacked layers, the Co layer may be represented by the formula $Co_{100-x}M_x$, where x denotes the amount of substitution in terms of atomic percent and M denotes the additive element(s) which may be at least one of the elements B, C, Al, Si, P, Ti, V, Fe, Ni, Cu, Ga, Ge, Zr, Nb, Mo, In, Sn, Sb, Gd, Tb, Dy and Ta. The optimum amount of substitution may vary slightly from one element to another. Thus, for M=Al, the amount x is $0.1 \leq x \leq 7$, for M=Zr, it is $0.1 \leq x \leq 14$, for M=Si, Mo or Ta, it is $0.1 \leq x \leq 20$, for M=Fe, it is $0.1 \leq x \leq 25$, for M=B, C, Ti, V, Cu, Ga, Ge, Nb, In or Sn, it is $0.1 \leq x \leq 30$, for M=P, it is $0.1 \leq x \leq 35$, for M=Gd, Tb or Dy, it is $0.1 \leq x \leq 40$, for M=Sb, it is $0.1 \leq x \leq 45$ and, for M=Ni, it is $0.1 \leq x \leq 70$.

The lower limit of the amount of substitution for each of the above elements is set to 0.1 atomic percent because the effect in lowering the Curie temperature cannot be demonstrated for the amount x lower than this limit value. On the other hand, the upper limit of the amount x is changed within the range of 7 to 40 atomic percent depending on the species of the additive elements. If the amount x is larger than this upper limit value, the result is retrogressive, that is, the magneto-optical effect is worsened.

The above mentioned third element(s) may be added to the Pt layer so that the Pt layer has the composition $Pt_{100-x}M_x$, where x dentes the amount of addition in atomic percent and $0 \leq x \leq 15$ and M denotes the additive element. However, such addition of the third element(s) should not be aimed at improving magneto-optical properties or thermal stability but rather mainly at adjusting the Curie temperature. The reason is that, if the third element(s) are added to the Pt layer, the Curie temperature is raised and the magnetic Kerr angle is diminished, excluding only rare exceptional cases. However, since the limitlessly low Curie temperature is not necessarily preferred in view of protection of the recording information, the Curie temperature which is markedly low from the outset may be raised to a practical range by using these measures. Among the elements that may be added to the Pt layer, there are Cr, Mn, Co, Zn, Y, Rh, Ag, La, Nd, Sm, Eu, Ho, Hf, W, Ir, Au, Pb and Bi, besides the elements enumerated hereinabove for the Co layer. The element Pt in the Pt layer may also be replaced in any desired proportion by the element Pd.

Similarly, when adding the additive element(s) to the Co layer of the artificial lattice film of consisting Co and Pd layers, deposited in stacked layers, the Co layer may be represented by the formula $Co_{100-x}M_x$, where x denotes the amount of substitution in terms of atomic percent and M denotes the additive element(s) which may be at least one of the elements P, Ti, V, Ni, Ga, Ge, B, C, Al, Si, Fe, Cu, Zr, Nb, Mo, In, Sn, Sb, Ta and W. The optimum amount of addition also is changed with the species of the additive element(s). Thus the optimum amount of addition x is given by $0.1 \leq x \leq 10$ for M=Zr, by $0.1 \leq x \leq 12$ for M=M=P or Al, by $0.1 \leq x \leq 20$ for M=Sn, Sb or W, by $0.1 \leq x \leq 25$ for M=Ti, V, Ni, Ga, Ge or Nb, by $0.1 \leq x \leq 30$ for M=B, C, Si, Fe, Cu, Mo or In and by $0.1 \leq x \leq 40$ for M=Ta. The reason for limitation is the same as that for the case of the Co—Pt based artificial lattice film discussed hereinabove.

Additive elements may be added to the Pd layer. The species and/or the amount of addition of the additive elements are the same as those for the Pt layer discussed hereinabove.

There is no limitation to the rare earth-transition metal film (RE-TM) film so that any such film so far known in the art may be employed. Specific examples of these films include TbFe, TbFeCo, TbFeCoCr, GdFeCo and GdTbFe films.

The rare earth-transition metal layer may be a rare earth-transition metal alloy film having no definite periodic structure. Thus it may be an artificial lattice film consisting of alternately stacked layers of rare earth layers of at least one of heavy rare earth elements Gd, Tb and Dy and transition metal layers having the composition $Fe_{(1-x)}Co_x$, where x is 0 to 1 and the numerical figure stands for atomic percent.

If the artificial lattice film is composed of alternately stacked rare earth layers and transition metal layers, these layers are preferably so stacked that the transition metal layer be disposed at an interface with the artificial lattice film composed of alternately stacked Co layer and the Pt and/or Pd layers. In this manner, a transition metal-transition metal bond is formed at the interface between the two films to achieve excellent coercivity.

Preferably, the thickness of the rare earth layer is 3 to 40 Å and that of the transition metal layer is 3 to 40 Å. These thickness ranges are set for optimizing recording characteristics and, outside these ranges, no satisfactory recording characteristics may be obtained.

The rare earth-transition metal film may be formed by vacuum thin film forming technique, such as sputtering, molecular beam epitaxy or vacuum deposition, most customarily by sputtering, on the substrate.

Concurrent binary sputtering employing a rare earth target and a transition metal target, for example, is particularly preferred. Alternately, a binary alloy composed of rare earth element(s) and transition metal(s) may be used as a target for sputtering.

The rare earth-transition metal film is preferably of a thickness ranging between 50 and 2000 Å for procuring practically sufficient and necessary coercivity.

As a substrate material, glass, polycarbonate, PMMA (polymethyl methacrylate), ceramics or a silicon wafer, may be employed. The substrate may also be a glass $2p$ substrate, i.e. a glass substrate having formed thereon a layer of light-curable resin having surface irregularities, such as grooves or pits.

There is no particular limitation to the construction of the recording layer in the magneto-optical recording medium of the present invention and any of a variety of conventional constructions may be employed. A dielectric layer, reflective layer or a protective layer etc. may also be formed, besides the recording layer, if so desired.

It is noted that any writing methods of signal writing on the magneto-optical recording medium, capable of providing an energy necessary for inverting magnetic domains, such as needle-type magnetic head, thermal pen or electron beams, may naturally be employed in addition to the light beams.

If, in this manner, the magnetic layer is of a multi-layer structure consisting of a Co—Pt(Pd) artificial lattice film composed of stacked Co and Pt and/or Pd layers, and a rare earth-transition metal alloy film or a rare earth-transition metal artificial lattice film, the Co—Pt (Pd) artificial lattice film is exchange-coupled with the rare earth-transition metal alloy film or the rare earth-transition metal artificial lattice film to improve coercivity of the Co—Pt(Pd) artificial lattice film. In this manner, superior photomagnetic properties of the Co—Pt(Pd) artificial lattice film may be maintained even with high density recording.

The present invention will be explained hereinbelow with reference to Examples on the basis of test results.

EXAMPLE 1

The present Example is directed to a magneto-optical disc comprised of a substrate on which are stacked a TbFeCo alloy film as an RE-TM film and a Co—Pt based artificial lattice film.

The schematic structure of the present magneto-optical disc is shown in FIG. 1.

The present magneto-optical recording medium is designed for recording and reproduction and includes an information-holding recording layer 2 on a major surface 1a of a glass substrate 1. This recording layer 2 is of a two-layer structure consisting of an RE-TM film 3 and an artificial lattice film 4.

The RE-TM film 3 is a TbFeCo alloy film having a film thickness of 500 Å.

The aforementioned artificial lattice film 4 is stacked on the RE-TM film 4. This artificial lattice film 4 is constituted by alternately stacked Co and Pt layers with the Co layer being disposed at an interface with the RE-TM film 3. The artificial lattice film 4 is exchange-coupled with the RE-TM film 3 and has a total thickness of 200 Å.

Such magneto-optical disc was prepared in the following manner.

First, for forming the RE-TM film 3 and the artificial lattice film 4 by a continuous process, targets of $Tb_{27}Fe_{61}Co_{12}$ alloy, where the subscripted figures denote atomic percents, Co and Pt targets, with the target diameter being each 100 mm, were placed in a chamber of a sputtering unit. This sputtering unit is so designed that desired films may be formed by opening or closing shutters provided for the respective targets.

The glass substrate 1 was loaded on a substrate holder and cooled with water, whilst the chamber was evacuated to a predetermined vacuum. An Ar gas was introduced into the chamber to produce an atmosphere at a pressure of 4 mTorr.

Magnetron sputtering was then performed in this atmosphere, whilst the glass substrate was rotated at 16 rpm, using the TbFeCo alloy as a target, to produce the RE-TM film 3. The electric power employed at this time was d.c. power of 0.3 A×240 V.

Then, using the Co and Pt targets, Co and Pt layers were formed alternately by concurrent binary magnetron sputtering in the Ar gas atmosphere maintained at the gas pressure of 4 mTorr to produce the above mentioned artificial lattice film 4. Sputtering conditions were so set that the rotational speed of the substrate was 16 rpm, the RF power used during the formation of the Co layer was 250 W and the d.c. power employed during formation of the Pt layer was 0.55×340 V.

EXAMPLE 2

The present Example is directed to a magneto-optical disc comprised of a substrate on which are stacked a TbFeCoCr alloy film as an RE-TM film and a Co—Pt based artificial lattice film.

In the present Example, the sputtering unit which was the same as that used in Example 1 was used, and targets of Tb, $Fe_{90}Co_4 Cr_6$ alloy, where the subscripted figures denote atomic percents, Co and Pt, each 100 mm in diameter, were placed within the chamber.

The glass substrate 1 was loaded on a substrate holder and cooled with water, whilst the chamber was evacuated to a predetermined vacuum. An Ar gas was introduced into the chamber to produce an atmosphere at a pressure of 4 mTorr. Concurrent binary magnetron sputtering was then performed in this atmosphere whilst the glass substrate was rotated at 50 rpm using Tb and an FeCoCr alloy as targets. An RF power of 130 W was used for Tb, whilst a d.c. power of 0.6 to 0.8 A×290 V was used for the FeCoCr alloy. A TbFeCoCr alloy film with a film thickness of 1,000 Å, not provided with a definite periodic structure, was formed by this sputtering operation.

Then, using the sputtering conditions similar to those used in Example 1, a Co—Pt artificial lattice film was formed to a thickness of 200 Å on the TbFeCoCr film, taking care so that the Co layer was disposed at an interface with the TbFeCoCr alloy film.

EXAMPLE 3

The present Example is directed to a magneto-optical disc comprised of a substrate on which are deposited a Tb—FeCoCr artificial lattice film as an RE-TM film and a Co—Pt based artificial lattice film, as stacked layers.

In the present Example, concurrent dual magnetron sputtering was performed in the same manner as in Example 2 except changing the rotational speed of the substrate to 16 rpm. The film formed at this time on the glass substrate 1 was an artificial lattice film consisting of alternately stacked Tb films and FeCoCr films having film thicknesses o approximately 4 Å and 6 Å, respectively. The total thickness of the Tb—FeCoCr artificial lattice film was set so as to be equal to 1,000 Å, and the stacking sequence was controlled so that a Tb layer was disposed on the upper surface.

Then, using the sputtering conditions same as those used for Example 1, the Co—Pt based artificial lattice film was formed to a film thickness of 200 Å on the Tb—FeCoCr artificial lattice film. At this time, a Co layer was formed on the upper surface of the Tb—FeCoCr artificial lattice film, so that the Tb and Co films were adjacent to each other at the interface between the Tb—FeCoCr artificial lattice film and the Co—Pt based artificial lattice film.

EXAMPLE 4

A magneto-optical disc was prepared in the same manner as in Example 3, except that an FeCoCr film, instead of the Tb film, was disposed at the interface with the Tb—FeCoCr artificial lattice film. Thus the transition metal layers, namely the FeCoCr layer and the Co layer, were disposed in this case on the interface between the Tb—FeCoCr artificial lattice film and the Co—Pt artificial lattice film.

COMPARATIVE EXAMPLE 1

The present Example is directed to a magneto-optical disc in which only an artificial lattice film composed of sequentially stacked Co and Pt layers is formed on a substrate.

In the present Example, using the sputtering conditions same as those used for the preparation of the Co—Pt based artificial lattice film in the preceding Example 1, artificial lattice films were formed on glass substrates to film thicknesses of 100 Å, 200 Å and 300 Å.

The coercivities of the produced magneto-optical discs were checked on the basis of the corresponding magnetic Kerr curves. It was found that, with the film thicknesses of the artificial lattice films of 100 Å, 200 Å and 300 Å, the coercivities were 0.2 kOe, 0.27 kOe and 0.27 kOe, respectively.

COMPARATIVE EXAMPLE 2

The present Example is directed to a magneto-optical disc in which only a TbFeCo alloy film functioning as an RE-TM film was formed on a substrate.

In the present Example, using the sputtering conditions same as those used for the preparation of the RE-TM film 3 in the preceding Example 1, a TbFeCo alloy film was formed on a glass substrate to a film thickness of 500 Å.

The coercivity of the magneto-optical disc was 12 kOe, as determined by checking the corresponding magnetic Kerr curve.

COMPARATIVE EXAMPLE 3

The present Example is directed to a magneto-optical disc in which only a TbFeCoCr alloy film functioning as an RE-TM film was formed on a substrate.

In the present Example, using the sputtering conditions same as those used for the preparation of the TbFeCoCr alloy film in the preceding Example 2, a TbFeCoCr alloy film was formed on a glass substrate to a film thickness of 1,000 Å.

The coercivity of the magneto-optical disc was 6 kOe, as determined by checking the corresponding magnetic Kerr curve.

COMPARATIVE EXAMPLE 4

The present Example is directed to a magneto-optical disc in which only an artificial lattice film consisting of sequentially stacked Tb films and FeCoCr films for functioning as an RE-TM film is provided on a substrate.

In the present Example, using the sputtering conditions same as those used for the formation of the Tb—FeCoCr artificial lattice film in Example 3, Tb—FeCoCr artificial lattice films were formed to film thicknesses of 200 Å and 1,000 Åon glass substrates.

For the Tb—FeCoCr artificial lattice films, with the film thicknesses of 200 Å and 1,000 Å, the coercivity was 6 kOe, as determined by checking the corresponding magnetic Kerr curves.

The photomagnetic effects of the magneto-optical discs, produced in the preceding Examples 1 to 4, were measured from the sides of the recording layers thereof, using the wavelength of 780 nm. By these measurements, magnetic Kerr curves shown in FIGS. 2 to 5 were obtained.

Figure 2:
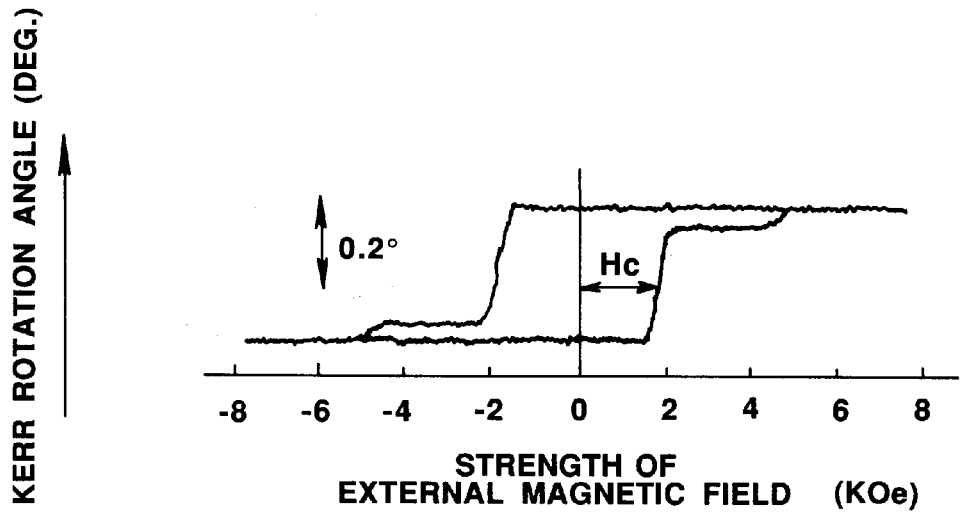
FIG. 2 is a graph showing a magnetic Kerr curve of a Co—Pt based artificial lattice film of a magneto-optical disc having a TbFeCo alloy film besides the Co—Pt based artificial lattice film on a substrate.

First, a magnetic Kerr curve for the recording layer consisting of the Co—Pt based artificial lattice film and an RE-TM film, stacked together, according to Example 1, is shown in FIG. 2, in which the angle of magnetic Kerr rotation in degrees is plotted on the ordinate and the strength of an external magnetic field in kOe is plotted on the abscissa.

Referring to FIG. 2, the magnetic Kerr curve for the magneto-optical disc of Example 1 is stepped, or changed in a step-like manner, which is thought to be ascribable to inversion of magnetization of the Co—Pt based artificial lattice film and the TbFeCo alloy film, making up the recording layer, under the external magnetic fields of different strengths. It was also found that, since the disc has higher coercivity, a high coercivity medium may be obtained by forming a Co—Pt based artificial lattice film on a TbFeCo alloy film and effecting exchange-coupling therebetween.

Figure 3:
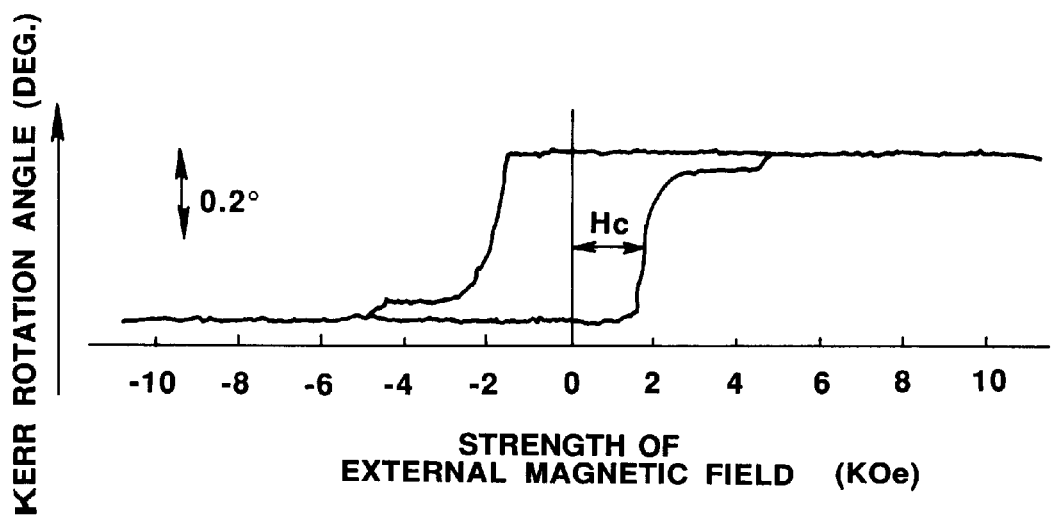
FIG. 3 is a graph showing a magnetic Kerr curve of a Co—Pt based artificial lattice film of a magneto-optical disc having a TbFeCoCr alloy film besides the Co—Pt based artificial lattice film on a substrate.
Figure 4:
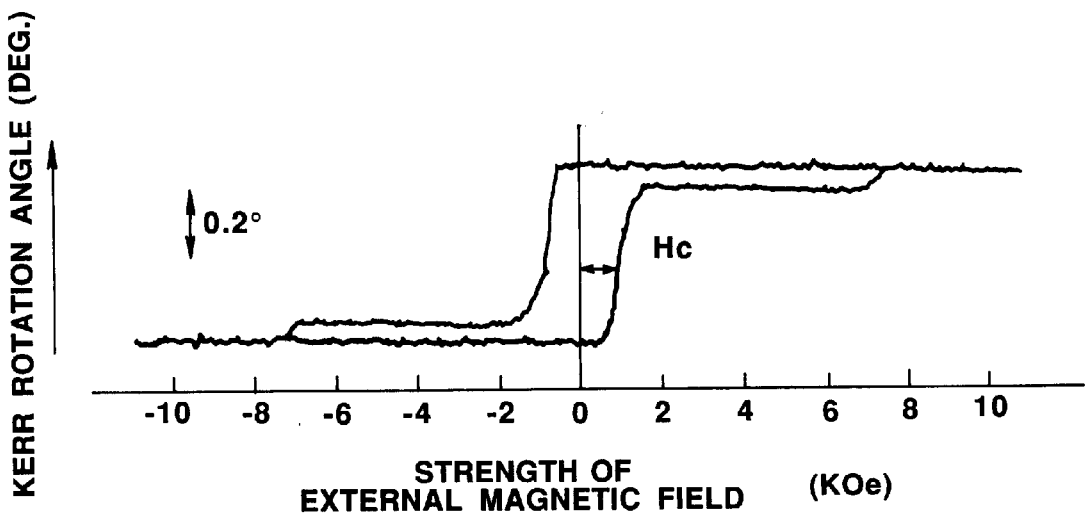
FIG. 4 is a graph showing a magnetic Kerr curve of a Co—Pt based artificial lattice film of a magneto-optical disc having a TbFeCoCr artificial lattice film besides the Co—Pt based artificial lattice film on a substrate and having a Tb layer formed at an interface adjacent to the Co—Pt based artificial lattice film.
Figure 5:
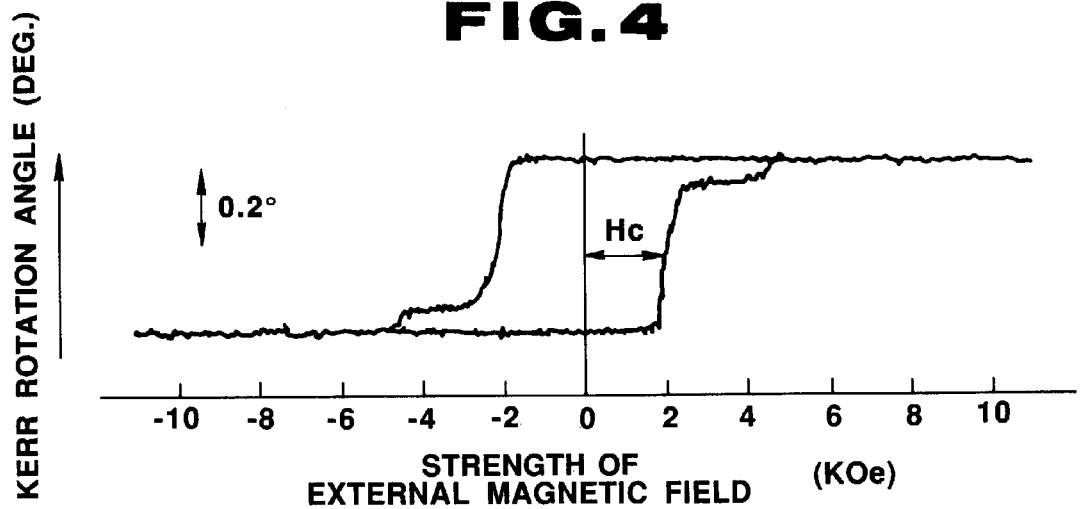
FIG. 5 is a graph showing a magnetic Kerr curve of a Co—Pt based artificial lattice film of a magneto-optical disc having a TbFeCoCr artificial lattice film besides the Co—Pt based artificial lattice film on a substrate and having a FeCoCr layer formed at an interface adjacent to the Co—Pt based artificial lattice film.

FIGS. 3 to 5 show magnetic Kerr curves for the Co—Pt based artificial lattice films of the magneto-optical discs according to Examples 2 to 4, respectively.

It is seen from these results that, in all of these cases, the magnetic Kerr curves were stepped, and that optimum results could be obtained when there is a TbFeCoCr alloy film or a FeCoCr film at an interface with the Co—Pt based artificial lattice film.

Table 1 shows the coercivities corresponding to inversion of magnetization of the Co—Pt based artificial lattice films of the magneto-optical discs of the Examples 1 to 4, together with the corresponding value for Comparative example 1.

TABLE 1

| | RECORDING LAYER STRUCTURE (Å) | | | | COERCIVITY OF Co—Pt BASED ANTI-FICIAL LATTICE FILM (kOe) |
|---|---|---|---|---|---|
| | Co—Pt BASED ARTIFICIAL LATTICE FILM | TbFeCo ALLOY FILM | TbFeCoCr ALLOY FILM | Tb—FeCoCr ARTIFICIAL LATTICE FILM | |
| Ex. 1 | 200 | 500 | — | — | 1.75 |
| Ex. 2 | 200 | — | 1000 | — | 1.78 |
| Ex. 3 | 200 | — | — | 1000 | 0.91 |
| Ex. 4 | 200 | — | — | 1000 | 2.04 |
| Comp. Ex. 1 | 200 | — | — | — | 0.27 |

It is seen from Table 1 that, when the Co—Pt based artificial lattice film and the RE-TM film are stacked together, coercivity may be improved markedly as compared to the case in which only the Co—Pt based artificial lattice film is provided as in Comparative Example 1. It is also seen from Examples 3 and 4 that exceedingly satisfactory results could be obtained when the FeCoCr layer was provided at an interface with the Co—Pt based artificial lattice film. From this it may be inferred that the RE-TM film may be used as an artificial lattice film and the Co—Pt based artificial lattice film be coupled to the RE-TM film at the respective transition metal films, for utmost results.

Then, in Example 4 which gave most satisfactory results in the measurement of the above mentioned magneto-optical effects, the film thicknesses of the Co—Pt based artificial lattice films and the Tb—FeCoCr artificial lattice films were changed as shown in Table 2 as in Examples 5 to 8, and the resulting recording layers were measured as to the photomagnetic results.

Table 2 shows the results of measurements of the coercivities of the Co—Pt based artificial lattice films of these magneto-optical discs by relying upon the photomagnetic effects. Meanwhile, the results of the Comparative Example 1 and the Example 2 are also shown in Table 2.

TABLE 2

| | RECORDING LAYER STRUCTURE (Å) | | COERCIVITY OF Co—Pt BASED ARTIFICIAL LATTICE FILM (kOe) |
|---|---|---|---|
| | Co—Pt BASED ARTIFICIAL LATTICE FILM | Tb—FeCoCr ARTIFICIAL LATTICE FILM | |
| Ex. 5 | 100 | 200 | 3.48 |
| Ex. 6 | 100 | 1000 | 4.37 |
| Ex. 7 | 200 | 200 | 1.48 |
| Ex. 4 | 200 | 1000 | 2.04 |
| Ex. 8 | 300 | 1000 | 1.26 |
| Comp. Ex. 1 | 100 | — | 0.20 |
| | 200 | — | 0.27 |
| | 300 | — | 0.27 |

It is seen from Table 2 that higher coercivity may be obtained in accordance with the present invention, and that, for the same film thickness of the Co—Pt based artificial lattice film, higher coercivities may be obtained for larger film thicknesses of the RE-TM film and, conversely, for the same film thickness of the RE-TM film, higher coercivities may be obtained for lesser film thicknesses of the Co—Pt based artificial lattice film.

Figure 6:
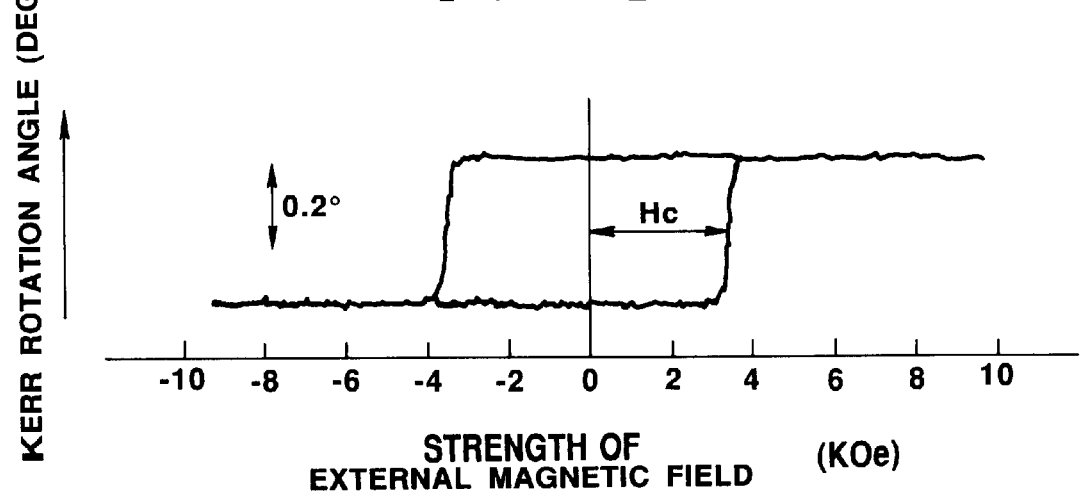
FIG. 6 is a graph showing a magnetic Kerr curve of a Co—Pt based artificial lattice film of a magneto-optical disk having formed on a substrate a recording layer comprised of a Co—Pt based artificial lattice film having a film thickness of 100 Å and a Tb—FeCoCr artificial lattice film having a film thickness of 200 Å.

In Examples 5 to 8, no step-like changes were noticed in the magnetic Kerr curves for Examples 5 to 8, as shown in FIG. 6. It is seen from this that, with lesser film thicknesses of the recording layers, the RE-TM film and the Co—Pt artificial lattice film were magnetized concurrently.

For each of the above mentioned above magneto-optical discs, the Kerr rotation angles in degrees were measured from the sides of the recording layers at wavelengths of 780 nm and 400 nm. The results are shown in Table 3. Meanwhile, the results for Comparative Example 4 are those for the film thickness of the Tb—FeCoCr artificial lattice film of 1,000 Å.

TABLE 3

| | RECORDING LAYER STRUCTURE (Å) | | | | KERR ROTATION ANGLE (°) | |
|---|---|---|---|---|---|---|
| | Co—Pt BASED ARTIFICIAL LATTICE FILM | TbFeCo ALLOY FILM | TbFeCoCr ALLOY FILM | Tb—FeCoCr ARTIFICIAL LATTICE FILM | 780 nm | 400 nm |
| Ex. 1 | 200 | 500 | — | — | 0.17 | 0.30 |
| Ex. 2 | 200 | — | 1000 | — | 0.19 | 0.29 |
| Ex. 5 | 100 | — | — | 200 | 0.17 | 0.21 |
| Ex. 6 | 100 | — | — | 1000 | 0.15 | 0.26 |
| Ex. 7 | 200 | — | — | 200 | 0.20 | 0.25 |
| Ex. 4 | 200 | — | — | 1000 | 0.19 | 0.29 |
| Ex. 8 | 300 | — | — | 1000 | 0.19 | 0.31 |
| Comp. Ex. 1 | 100 | — | — | — | 0.31 | 0.34 |
| | 200 | — | — | — | 0.25 | 0.31 |
| | 300 | — | — | — | 0.21 | 0.29 |
| Comp. Ex. 2 | — | 500 | — | — | 0.25 | 0.09 |
| Comp. Ex. 3 | — | — | 1000 | — | 0.15 | 0.04 |
| Comp. Ex. 4 | — | — | — | 1000 | 0.22 | 0.11 |

It is seen from Table 3 that the recording layers of the magneto-optical discs according to the present invention exhibit larger Kerr rotation angles in a short wavelength range than those of the conventional RE-TM films formed of, for example, TbFeCo based materials. In this manner, a magneto-optical recording medium capable of exhibiting superior photomagnetic properties even in a short wavelength range may be obtained.

The above test results demonstrate that the Co—Pt based artificial lattice film and the TbFeCoCr alloy film or the Tb—FeCoCr artificial lattice film may be advantageously stacked for improving magnetic properties, above all, coercivity.

Next, magneto-optical discs having a structure closer to the actually employed structure were prepared for measuring the recording magnetic field characteristics.

COMPARATIVE EXAMPLE 5

An SiN film was formed to a thickness of 800 Å by a magnetron sputtering method on a 2P disc substrate which is a glass substrate having grooves formed thereon by UV curable resin. A Co—Pt artificial lattice film was then formed thereon to a thickness of 200 Å to produce a dual-layer magneto-optical disc.

In forming the SiN film, a gas mixture of Ar and $N_2$ with a mixing ratio of 1:1 and a gas pressure of $2 \times 10^{-3}$ Torr were used, and a power of 400 W was applied to the Si target.

In forming the Co—Pt artificial lattice film, a sputtering gas was an Ar gas at a pressure of $4 \times 10^{-3}$ Torr were used and an RF power of 250 W and a DC power of 170 W were applied simultaneously to the Co and Pt targets for effecting electrical discharge simultaneously for alternately depositing both atomic layers while the 2P disc substrate was rotated at 16 rpm.

Under these conditions, the coercivity of the Co—Pt based artificial lattice film amounted to 300 Oe.

The recording magnetic field dependency of the carrier and noise levels was then measured of the produced magneto-optical disc. The conditions of evaluation are as shown below, and the recording power was an optimum power, i.e. a power for which the second harmonics of the reproduced signals were at the minimum level.

| | |
|---|---|
| number of revolutions: | 1,000 rpm |
| position of recording: | 5 cm n radius |
| recording frequency: | 500 kHz |
| reproducing power: | 1 mW |

Figure 7:
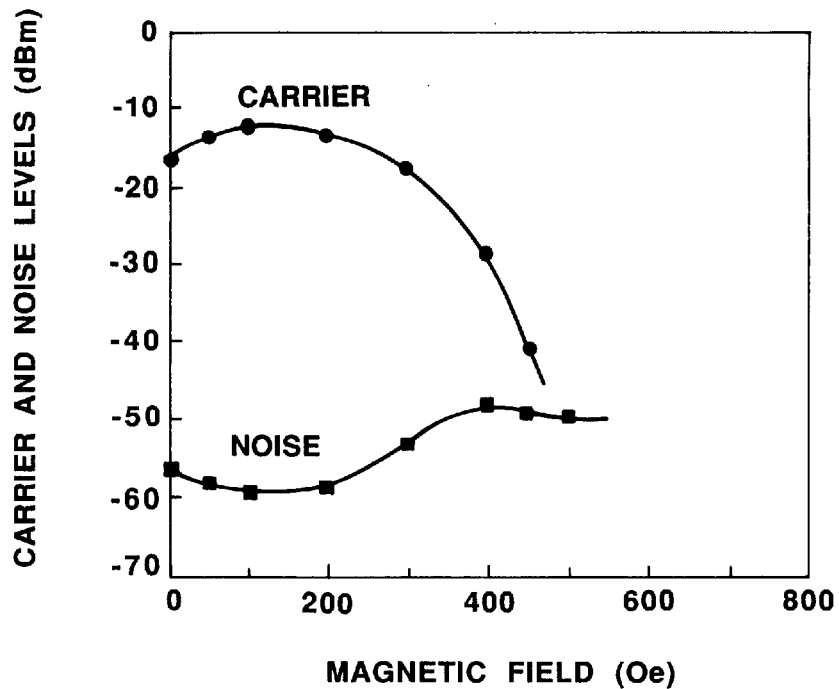
FIG. 7 is a graph showing recording magnetic field dependency of the carrier and noise level of a magneto-optical disc having only a Co—Pt based artificial lattice film as a recording layer.

The results are shown in FIG. 7, from which it is seen that, when the recording magnetic field exceeds 200 Oe, the noise level starts to be increased while the carrier level starts to be decreased, until recording becomes impossible at the recording magnetic field of 500 Oe. The range of the recording magnetic field which gives a high CN ratio is as low as 50 to 200 Oe so that the recording magnetic field characteristics cannot be said to be satisfactory.

EXAMPLE 9

A magneto-optical disc having the same structure as that of Comparative Example 5 was prepared, and a TbFeCo alloy film and a SiN film wee then formed thereon in this order to film thicknesses of 1,000 Å and 500 Å, respectively.

In forming the TbFeCo alloy film, the sputtering gas employed was Ar maintained at a pressure of $4 \times 10^{-3}$, and a dc power of 120 W was applied to a $Tb_{23}Fe_{73}Co_4$ alloy target. Sublattice magnetization of the transition metal was prevalent in the so-formed TbFeCo alloy film.

The uppermost SiN payer was formed under the same conditions as those for the first layer.

Figure 8:
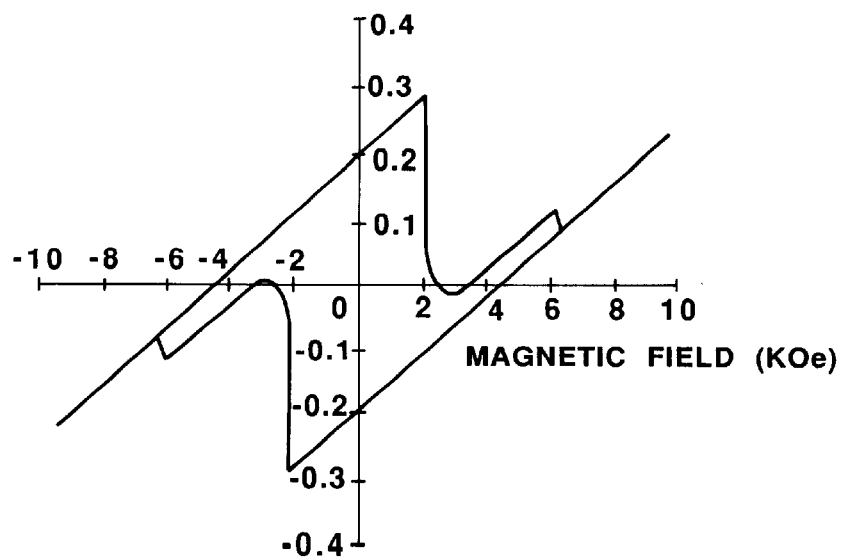
FIG. 8 is a graph showing a magnetic Kerr curve, as measured from a substrate side, of a magneto-optical disc having, as a recording layer, a Co—Pt based artificial lattice film and a TbFeCo alloy film, stacked together, wherein sublattice magnetization of transition metals is predominant.

A Kerr loop as measured from the substrate side of the magneto-optical disc is shown in FIG. 8, from which it is seen that, while the Co—Pt artificial lattice film undergoes inversion of magnetization at a point A therein, coercivity of the Co—Pt artificial lattice film is increased as compared to the value of [300 (Oe)] shown in Comparative Example 5.

Figure 9:
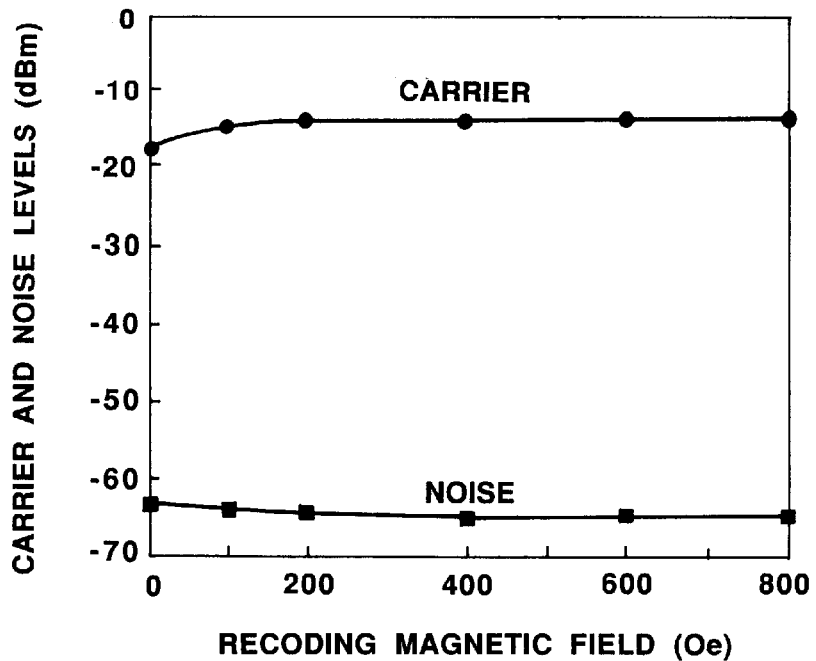
FIG. 9 is a graph showing recording magnetic field dependency of the carrier and noise level of a magneto-optical disc having, as a recording layer, a Co—Pt based artificial lattice film and a TbFeCo alloy film, stacked together, wherein sublattice magnetization of transition metals is predominant.

The recording magnetic field dependency of the carrier and noise levels, as measured under the same conditions as those for Comparative example 5, is shown in FIG. 9, from which it is seen that the recording magnetic field characteristics are improved significantly, as compared to Comparative example 5, to reflect increased coercivity. The maximum CN ratio is 52 dB which is higher than the corresponding value of 48 dB in Comparative example 5.

EXAMPLE 10

A magneto-optical disc was prepared under the same conditions and procedure as those for Example 9 except using a $Tb_{26}Fe_{70}Co_4$ alloy target as a target used for forming a TbFeCo alloy film. In this case, sublattice magnetization of the rare earth element of the TbFeCo alloy film is prevalent.

Figure 10:
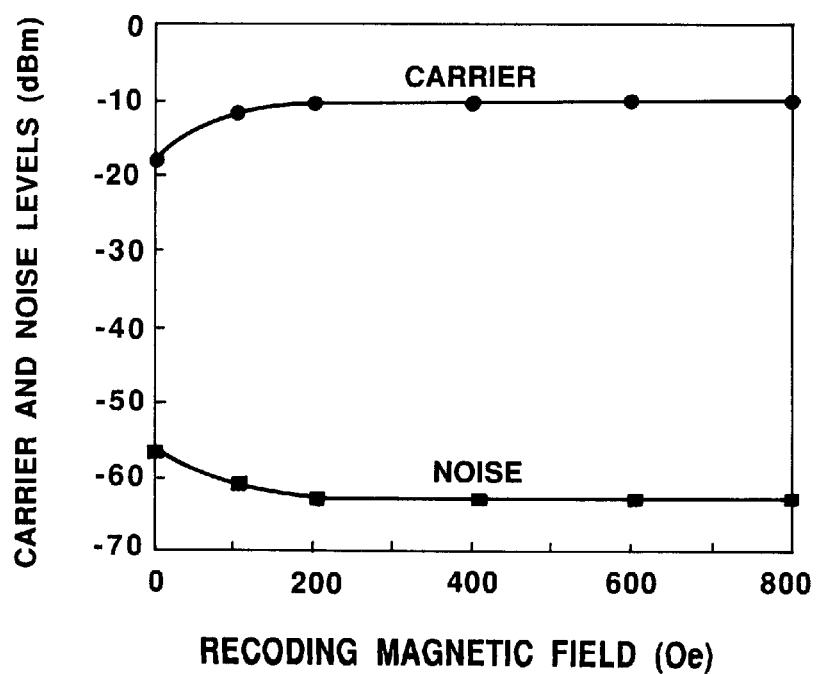
FIG. 10 is a graph showing recording magnetic field dependency of the carrier and noise level of a magneto-optical disc having, as a recording layer, a Co—Pt based artificial lattice film and a TbFeCo alloy film, stacked together, wherein sublattice magnetization of rare earth elements is predominant.

The recording magnetic field dependency of the carrier and noise levels, as measured under the same conditions as those for comparative example 5, are shown in FIG. 10, from which it is seen that the effects demonstrated in Example 9 in improving coercivity of the artificial Co—Pt lattice film and characteristics of the recording medium of the magneto-optical disc may similarly be obtained in cases wherein sublattice magnetization of the rare earth elements in the TbFeCo alloy film is prevalent.

Similar effects may also be obtained when a Co—Pd artificial lattice film is substituted for a Co—Pt artificial lattice film and wherein an artificial lattice film is substituted for a rare earth-transition metal film.

From the foregoing it is seen that, with the magneto-optical recording medium according the present invention, the magnetic layer is of a multilayer structure consisting of an artificial lattice film obtained by alternately stacking Co and Pt and/or Pd layers and a rare earth-transition metal layer, so that high coercivity due to the rare earth-transition metal film may be achieved while a satisfactory Kerr rotation angle in a shorter wavelength range may be maintained by the artificial lattice film. Thus, according to the present invention, a magneto-optical recording medium may be provided which may cope with next-generation high density recording employing a short wavelength laser.

What is claimed is:

1. A magneto-optical recording medium comprising:

a substrate;

an artificial lattice recording film, said artificial lattice film consisting of stacked first layer of Co and second layer of an element selected from the group consisting of Pt and Pd; and a rare earth-transition metal film positioned between said artificial lattice recording film and said substrate;

wherein;

each first layers of said artificial lattice film has a thickness of 2–8 Å if said second layer consist of Pt, each of said first layers of said artificial lattice film has a thickness of 1–9 Å if said second layers consist of Pd, each of said second layers of said artificial lattice film has a thickness of 3–40 Å if said second layers consist of Pt, each of said second layers of said artificial lattice film has a thickness of 2–40 Å if said second layers consist of Pd, said artificial lattice film has an overall thickness of 50 to 800 Å, said artificial lattice film and said rare earth-transition metal films are exchange coupled to one another, and said rare earth-transition metal film includes a rare earth metal and a transition metal.

2. A magneto-optical recording medium as claimed in claim 1 characterized in that said rare earth-transition metal film is a rare earth-transition metal alloy film.

3. A magneto-optical recording medium as claimed in claim 1 characterized in that said rare earth-transition metal film is an artificial lattice film constituted by a rare earth layer and a transition metal layer stacked together.

4. A magneto-optical recording medium as claimed in claim 3 characterized in that the artificial lattice film is constituted by alternatively stacked Co and Pt layers, and the rare earth-transition metal layer and artificial lattice film are stacked together so that respective transition metal layers are adjacent to each other.

5. A magneto-optical recording medium as claimed in claim 1, wherein said artificial lattice film has an overall thickness of 50 to 400 Å.

6. A magneto-optical recording medium as claimed in claim 1, wherein each of said second layers of said artificial lattice films consist of Pd.

7. A magneto-optical recording medium as claimed in claim 1, wherein each of said second layers of said artificial lattice film consists of Pt.

8. A magneto-optical recording medium as claimed in claim 1, wherein said second layers of said artificial lattice film alternatively consist of both Pt and Pd, but a given second layer consists of only one of Pt and Pd.

* * * * *